United States Patent [19]

Apostolos et al.

[11] Patent Number: 5,029,235

[45] Date of Patent: Jul. 2, 1991

[54] COMPRESSIVE RECEIVER

[75] Inventors: John T. Apostolos, Merrimack, N.H.; Chester E. Stromswold, and Robert H. Carrier, both of Durham, N.H.

[73] Assignee: Sanders Associates, Inc., Nashua, N.H.

[21] Appl. No.: 286,188

[22] Filed: Dec. 19, 1988

Related U.S. Application Data

[62] Division of Ser. No. 916,072, Oct. 6, 1986, Pat. No. 4,808,950.

[51] Int. Cl.[5] .......................... H04B 1/26; H01P 9/00

[52] U.S. Cl. ...................................... 455/72; 455/328; 333/157; 333/236

[58] Field of Search ................. 455/145, 146, 147, 72, 455/226, 600, 325-330; 375/94, 96; 333/157, 236, 240

[56] References Cited

U.S. PATENT DOCUMENTS

| | | | |
|---|---|---|---|
| 4,525,693 | 6/1985 | Suzuki et al. | 333/236 |
| 4,704,737 | 11/1987 | Estlick et al. | 455/146 |
| 4,808,950 | 2/1989 | Apostolos et al. | 333/157 |
| 4,928,316 | 5/1990 | Heritage et al. | 455/200 |

*Primary Examiner*—Curtis Kuntz
*Attorney, Agent, or Firm*—David W. Gomes

[57] ABSTRACT

An electromagnetic dispersive delay line (10) includes a dielectric strip (28) as well as a coupler (24, 34, 36, and 38) for launching surface electromagnetic waves into the dielectric strip. The upper surface of the dielectric strip (28) is left exposed to the air in order to provide an interface with a lower-permittivity medium of propagation. This permits a surface-electromagnetic-wave propagation mode. The thickness of the dielectric strip (28) is varied along its length so as to result in a linear relationship of delay to frequency throughout a predetermined frequency range. Preferably, a conductive strip (26) spaced from the dielectric strip extends along the surface-wave propagation path in the region occupied by the evanescent field external to the dielectric strip (28). This conductive strip (26) modifies the phase relationships between the electric and magnetic fields in the evanescent-field region so as to cause some of the power transmission to occur outside of the dielectric strip. This modifies the dispersion curve so as to extend the bandwidth of significant dispersion.

5 Claims, 3 Drawing Sheets

COMPRESSIVE RECEIVER

CROSS-REFERENCE TO RELATED APPLICATION

This is a division of application Ser. No. 916,072, filed Oct. 6, 1986, now U.S. Pat. No. 4,808,950

BACKGROUND OF THE INVENTION

The present invention relates to delay lines. It relates particularly to linear dispersive delay lines of the type used, for instance, in compressive receivers.

Linear dispersive delay lines are employed in compressive receivers to compress chirped signals in time so that simultaneously occurring signals of different frequencies are compressed into pulses that can be resolved in time in accordance with the signal that gave rise to them. The type of delay line that has typically been used in the past is the acoustic-wave delay line, which is a strip of a material, such as aluminum, that can serve as a propagation medium for acoustic waves and is dispersive throughout a range of frequencies. That is, the propagation velocity of the acoustic waves in this range of frequencies is a significantly varying function of frequency, so the delay introduced by a given length of the delay line is, too. The particular velocity-versus-frequency relationship depends on the cross-sectional dimensions perpendicular to the direction of propagation, and these can be varied throughout the length of the delay line so that the delay-versus-frequency relationships of the various sections of the delay line together yield a desired delay-versus-frequency relationship different from that of any individual section. For compressive receivers, the relationship is linear: the delay difference for a given frequency difference is constant throughtout the frequency range.

Conventional linear dispersive delay lines are limited in both frequency and bandwidth. Few are operable above 1.0 GHz, and bandwidths achievable by such delay lines are rarely greater than 0.5 GHz. Additionally, such delay lines cause considerable attenuation in the process of converting from electromagnetic energy to acoustic energy.

It is an object of the present invention to extend the frequency range of linear dispersive delay lines and other delay lines having customized dispersion relationships. It is a further object to provide an improved delay line.

SUMMARY OF THE INVENTION

The foregoing and related objects are achieved in a delay line that includes a dielectric body made of a material that has a relatively high dielectric constant and that extends in the direction of intended propagation to provide a delay-line propagation path. Titanium dioxide, with a dielectric constant of 100, is one such material, but other high-permittivity materials can also be used. At least one surface parallel to the propagation path is left unobstructed to allow evanescent fields adjacent to the free surface to accompany the electromagnetic radiation propagating through the dielectric body. The result is a so-called surface electromagnetic wave.

In this mode of propagation, a wave propagating through the dielectric body at a high frequency is essentially encountering the free surface at a shallow angle. Since the surface represents an interface with a propagation medium (typically air) that has a much lower permittivity and no greater permeability, the wave undergoes total internal reflection. The energy-carrying electromagnetic wave is therefore confined to the dielectric body, although the surface electromagnetic wave is further characterized by electric and magnetic fields adjacent to the free surface outside the dielectric body. But these fields are evanescent and, in the absence of any phase-changing material such as a conductor, totally reactive.

At lower frequencies, at which the wavelengths are comparable to the smallest cross-sectional dimension of the delay line, the wave must take a steeper angle to the interface in order to provide a half cycle of variation between the two surfaces of the dielectric body. As a consequence, the speed of the wave along the path decreases and its delay increases until the delay reaches a maximum at a frequency in the neighborhood of that at which the electromagnetic waves encounter the interface at the critical angle. For frequencies below this value, some of the energy-carrying radiation propagates beyond the interface, and wave propagation begins to partake of the nature of propagation though an air dielectric. Consequently, as the frequency decreases—and the medium of propagation becomes more and more predominantly the air—the velocity of propagation increases and the delay decreases.

Thus, the delay line is dispersive near the wavelength that corresponds to the critical angle, and the delay reaches a maximum near this frequency. In systems in which the delay line is used, signals applied to it are band-limited to a frequency regime on one or the other side of the maximum-delay frequency so as to achieve the desired monotonic dispersion relationship. As might be expected, the frequency at which the maximum delay occurs depends on the thickness of the delay line, i.e., its minimum dimension perpendicular to the direction of propagation. For the delay line of the present invention, this dimension varies along the length of the delay line so that the delay curves for the successive sections of the delay line add. The lengths and thicknesses of the successive sections are chosen, as they are in acoustic-wave delay lines, to achieve the desired, typically linear relationship of delay to frequency. Input and output couplers at opposite ends of the propagation path couple signals into and out of the delay line. With this arrangement, high frequencies and a wide frequency range can be achieved in linear and other custom-delay-relationship delay lines.

According to one aspect of the invention, the bandwidth of the delay line is extended and its lower frequency lowered by providing a pair of conductors on opposite sides of the dielectric body. One of the conductors can act as a ground plane for the delay line, in which case it is placed flush against one surface of the dielectric body extending along the propagation path. If the conductor is used as a ground plane in this manner, it prevents formation of the evanescent fields adjacent to the surface on which it is disposed. For support of the surface-electromagnetic-wave mode of propagation, the characteristic evanescent field must be permitted to form adjacent to at least one of the dielectric-body surfaces that extends along the path, so at least the other conductor is spaced from the free surface. It is disposed in the evanescent field, however, to modify it for purposes that will become apparent directly.

At higher frequencies, such a delay line operates in a manner substantially the same as that in which it would operate in the absence of the conductor from the evanescent field. That is, the power flow represented by the electromagnetic radiation is largely restricted to the dielectric body, although the relative phases of the electric and magnetic fields are changed by the currents that the evanescent fields induce in the conductor. Those fields, which are strictly reactive in the absence of the conductor, therefore represent some fraction of the power flow in the presence of the conductor. The two conductors thus partake of some transmission-line behavior, which becomes more significant as the signal frequency approaches the peak-delay frequency. The transmission-line behavior becomes dominant as the frequency falls below the peak-delay frequency so that the device acts as a non-dispersive transmission line at frequencies well below the peak-delay frequency.

The input and output antennas are coupled to both the waveguide and the transmission line so that, although the peak delay is reduced, the frequency band of significant dispersion is extended to lower frequencies to give greater bandwidth. Furthermore, the attenuation in the frequency range below the peak delay is reduced. Additionally, since the effect of the conductor depends on its separation from the conductor surface, that separation, like the thickness of the dielectric body, can be varied to produce the desired dispersion relationships.

In accordance with another aspect of the invention, more than one signal is launched simultaneously into the dielectric body by a corresponding number of input couplers so that the delay line is a two-dimensional delay line. A plurality of output antennas receive signals from separate points in the dielectric body. The dispersion relationships are arranged as before to achieve the linear or other desired delay-versus-frequency relationship. The result of this arrangement depends on the geometry of the two-dimensional delay line, but the two most common forms are the focusing and imaging versions. In the focusing version, the waves excited by the input signals interfere at an output line on which the output couplers are disposed. The interference occurs in such a manner that the pattern set up on the output line represents the spatial Fourier transform of the ensemble of signals introduced by the input couplers. In the imaging version, the two-dimensional delay line is arranged to include an image point for each input coupler, and an output coupler is disposed at each image point so that each output coupler receives only waves generated by the input coupler at whose image point that output coupler is disposed. Such a two-dimensional delay line can be used to provide a plurality of delay-line channels without the expense of a plurality of delay lines, and it has the additional advantage that it tends to result in phase tracking among the several channels.

BRIEF DESCRIPTION OF THE DRAWINGS

These and further features and advantages of the present invention are described in connection with the accompanying drawings, in which.

DETAILED DESCRIPTION OF AN ILLUSTRATIVE EMBODIMENT

Figure 1:
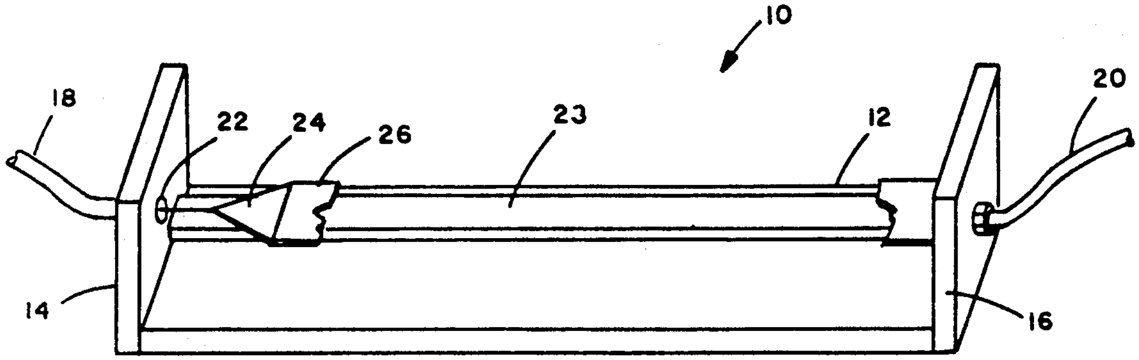
FIG. 1 is an isometric view, with parts broken away, of a dispersive delay line that incorporates the teachings of the present invention.

FIG. 1 depicts a linear dispersive delay line 10 that incorporates the teachings of the present invention. It includes a planar copper ground-plane conductor 12 and conductive brackets 14 and 16 attached to its ends so as to form an electrical connection. The outer conductors of coaxial cables 18 and 20 are electrically connected to the brackets 14 and 16, respectively, so that a continuous conductive path exists between the outer conductors of cables 18 and 20. The inner conductor of coaxial cable 18 extends through an aperture 22 to make an ohmic connection to an elongated conductive strip that includes a wave-launching, or antenna portion 24 and an elongated shield portion 26. The shield portion 26 is broken away in FIG. 1 to reveal a surface-electromagnetic-wave guide 28, which consists of an elongated strip of titanium dioxide, a material with a dielectric constant of about 100.

Figure 2:
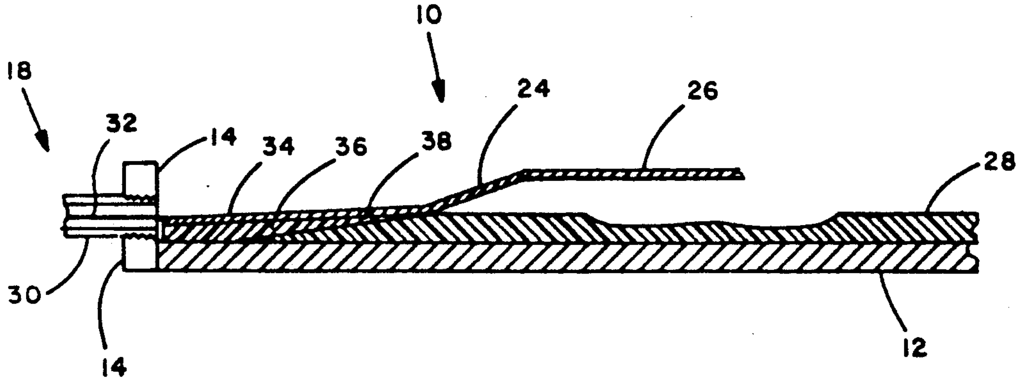
FIG. 2 is a cross-sectional view of the dispersive delay line of FIG. 1.

FIG. 2 depicts the delay line 10 of FIG. 1 in cross section, showing that the input-cable outer conductor 30 is connected to the input bracket 14 and illustrating in more detail the coupling of the inner conductor 32 to the wave guide 28.

Specifically, the inner conductor 32 is soldered or otherwise ohmically connected to a conductive path 34 provided on the upper surface of a sapphire transition strip 36. The dielectric constant of sapphire is around 10, which is the geometric mean of the dielectric constants of titanium dioxide and the air (or equivalent) dielectric in the coaxial cable 18. The transition strip 36 is tapered and in intimate contact with a complementarily tapered transition region 38 of the waveguide 28. This gradual transition from the air dielectric to the titanium dioxide dielectric minimizes reflection and maximizes the coupling of power from the coaxial cable 18 to the waveguide 28.

Near the end of the sapphire section 36, the conductive path 34 is connected to the antenna 24, which is inclined upward to the conductive shield 26 so that both the antenna and the shield are separated from the titanium dioxide dielectric 28. As those skilled in the are will recognize, this results in launching of a so-called surface electromagnetic wave into the dielectric, which acts as a waveguide for this mode of electromagnetic-radiation propagation. A surface electromagnetic wave is an electromagnetic wave that propagates through a dielectric body at least one of whose defining surfaces extends in the direction of propagation and constitutes an interface with a dielectric of a lower electrical permittivity.

In the delay line of FIGS. 1 and 2, a transmission line is formed by the conductors of the coaxial cable, which are separated by a single-permittivity dielectric. The transition to the waveguide forms another transmission line, in which the conductive path 34 and the ground plane 12 are separated by what is in effect a dielectric with a gradually changing permittivity. Throughout these regions, the surface of the dielectric is in intimate contact with a conductor, which thus confines the electromagnetic waves to the dielectric. At the point at which the antenna portion 24 separates from the dielectric, on the other hand, the upper surface of the dielectric no longer is provided with means for preventing the internal wave propagation from being accompanied by fields in the external region above the dielectric.

However, the free surface of the titanium dioxide dielectric 28 does constitute an interface between two propagation media having much different propagation velocities. Consequently, total internal reflection occurs at the interface to confine the power to the dielectric for all frequencies above a cutoff frequency. But total internal reflection does not mean that propagation of electromagnetic power through the dielectric is unaccompanied by electric and magnetic fields outside the waveguide. Such fields are part of the surface-electromagnetic-wave mode of propagation, but these fields are evanescent, falling off exponentially with distance from the dielectric surface. Furthermore, in the absence of some phase-changing device such as the shield 26, the electric and magnetic fields are completely out of phase and so represent no transmission of power.

Exponential attenuation within the medium is characteristic of, for instance, surface acoustic waves, so this mode of transmission, in which the exponential attenuation occurs, has acquired the name surface electromagnetic wave even though the electromagnetic waves propagate throughout the body of the medium and the exponential attenuation with distance occurs outside the medium.

Figure 3:
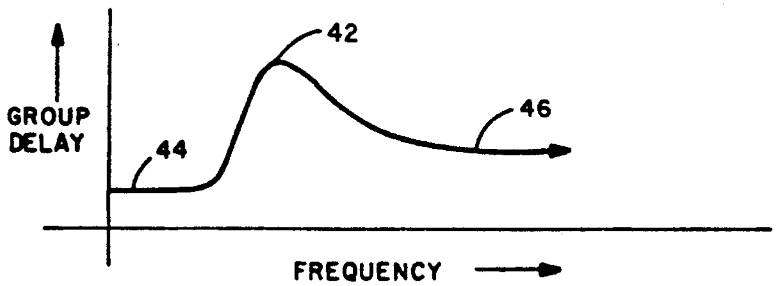
FIG. 3 is a graph of the delay of a constant-thickness surface-electromagnetic-wave guide as a function of frequency.

Propagation in this mode is dispersive: the group velocity of the radiation depends on its frequency. FIG. 3 is a typical plot of group delay versus frequency for a surface-electromagnetic-wave guide. In the upper-frequency region 40 the group delay is largely independent of frequency. As frequency decreases, however, so does group delay until it reaches a peak value 42. This represents the frequency at which total internal reflection no longer occurs, and energy "leaks" from the waveguide. The frequency at which this peak occurs depends on the thickness of the dielectric; the thicker the dielectric, the lower the frequency of the peak. For the particular waveguide of FIGS. 1 and 2, the effective thickness of the waveguide is twice its actual thickness because the ground-plane conductor sets up currents that mirror the dielectric strip 28 in a virtual dielectric strip below it. The illustrated embodiment is thus equivalent to an embodiment of the invention having no ground plane but rather a dielectric strip that is twice as thick and has a second shield on the other side of the dielectric from the first shield 26.

For frequencies below that represented by point 42, group delay rapidly decreases until it reaches a level 44 that represents the delay that results from the same length of travel in the surrounding air dielectric. In other words, region 44 represents a regime in which, although electromagnetic radiation does propagate through the dielectric, the waveguide is essentially transparent, and the relevant medium is the surrounding air; the dielectric slab does not serve as a waveguide in this regime. For an apparatus in which power coupled out of the apparatus is restricted largely to that represented by the waves in the waveguide, region 44 further represents a regime of high attenuation, since the power is not confined to the dielectric.

Figure 4:
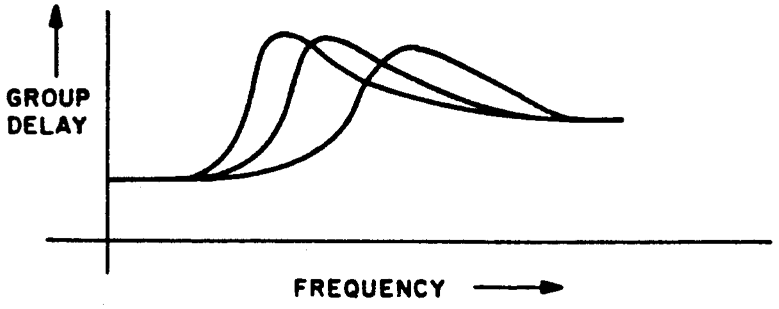
FIG. 4 is a family of such curves for waveguides of different thicknesses.
Figure 5:
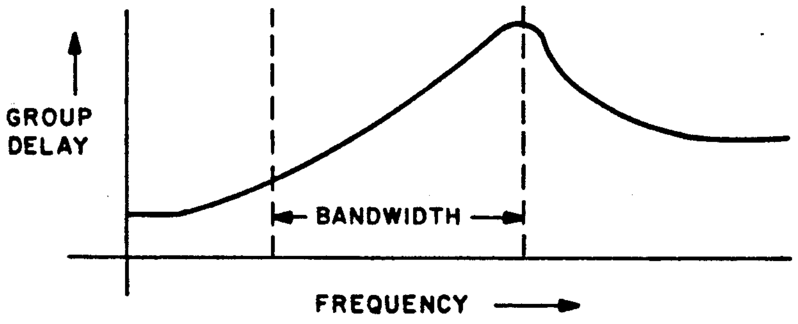
FIG. 5 is a graph of the delay of a multiple-thickness surface-electromagnetic-wave guide as a function of frequency.

While the curve of FIG. 3 represents the behavior of a dielectric slab of uniform thickness, the waveguide 28 of FIG. 2 is contoured so that its thickness varies with distance along the waveguide. Thus, the peak delays for different parts of the path differ, as the family of curves shown in FIG. 4 illustrates. The composite group-delay curve for the total waveguide is equal to the sum of the curves for its component sections. Those skilled in the art will recognize that it is possible, by choosing the right contour, to make this sum have a linear relationship of delay to frequency throughout a wide bandwidth. Analogous contouring is provided routinely in conventional linear dispersive acoustic delay lines. Such a relationship of group delay to frequency is illustrated in FIG. 5.

In a typical linear dispersive acoustic delay line, the two parameters that can be adjusted to adjust the dispersion relationship of a particular constant-thickness section of the delay line are the thickness of the dielectric and the length of the section. The same types of adjustments can be made to achieve a linear dispersive electromagnetic delay line.

In the illustrated embodiment, however, the height of the conductive strip 26 above the dielectric body 28 is another parameter used to achieve the desired dispersion relationship. Unlike thickness and length, this parameter can be used to affect the fundamental shape of the dispersion relationship. When thickness and length are changed, the fundamental shape of the dispersion relationship for a constant-thickness section is not changed; the length merely determines the delay scale, while the thickness determines the frequency scale. That is, the curves of FIG. 4 would be superimposed if different scales were used for the different curves.

The physical effect of the conductive strip 26 is conduction of current in response to the evanescent field above the dielectric strip 26. This current changes the relationship that would otherwise prevail between the phases of the electric and magnetic fields. This phase change results in transmission of some fraction of the power by the fields outside the dielectric, and the dispersion curve changes as a result.

Figure 6:
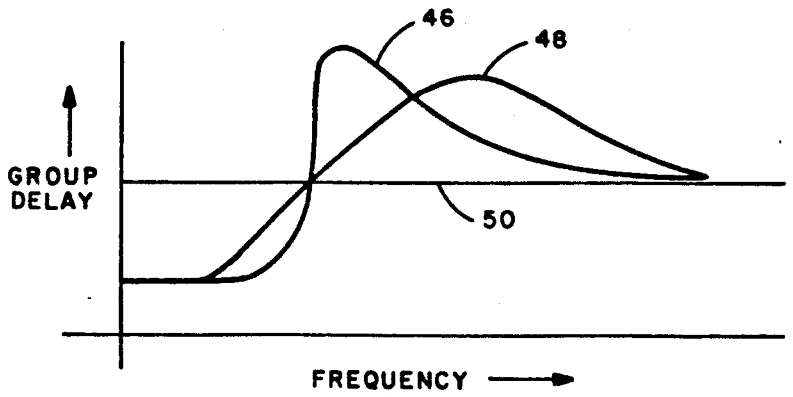
FIG. 6 is a family of curves of delay versus frequency for constant-thickness dielectric waveguides with no conductor in the evanescent-field region, with a conductor disposed in the evanescent-field region but spaced from the dielectric surface, and with a conductor disposed flush against the waveguide surface.

These effects can be seen in FIG. 6. Curve 46 of FIG. 6 represents the relationship that would prevail in the absence of a conductor in the evanescent field. It is a relatively steep curve with a high peak. Curve 48 represents the relationship that would prevail with the conductor disposed in the field at a particular distance from the surface of the dielectric. In this curve, the peak delay has been reduced and the curve is gentler, notably in the region of interest, i.e., in the frequencies below that of the peak. The peak delay and the steepness of the curve depend on the distance of the conductor from the surface of the dielectric. Curve 50 represents the relationship that would prevail if that distance were zero; i.e., the device would simply be a non-dispersive transmission line.

We have made a prototype delay line of this type with a 0.155-inch-wide (0.394-cm-wide) strip of titanium dioxide between 0.97 and 0.096 inch (0.178 and 0.244 cm) thick. A 60-inch (150-cm) delay line with a copper ground plane and a copper shield 2 inches (5.1 cm.) wide and spaced between 0.10 and 0.15 inch (0.25 and 0.38 cm.) from the dielectric resulted in a linear dispersive delay line having a center frequency of 5 GHz and a bandwidth of 1.5 GHz.

It is not necessary, in order to carry out the broader teachings of the present invention, to provide such a conductive strip, but it gives an additional degree of freedom by which to adjust the dispersion relationships. More important, it permits a broader bandwidth to be achieved. Placing a conductor in the evanescent field extends the bandwidth of the delay line in two ways; in addition to making the part of the curve below cutoff gentler, the use of a conductor reduces the attenuation in this region of operation.

In the absence of the conductor, the device has a desirably high peak delay, but the dispersion for frequencies below that of the peak is significant and monotonic over only a small bandwidth, and the attenuation in this region is great. For the behavior represented by curve 50, on the other hand, there is little attenuation at the low frequencies of interest; the device is acting as a transmission line. This lack of attenuation is desirable, but the transmission line, of course, lacks the desired dispersion. A conductor spaced from the surface of the dielectric in a part of the evanescent-field region results in a behavior that is intermediate between these two extremes: although the peak delay is not as high as it is for the no-conductor arrangement, it is significant for a broader range of frequencies, and the attenuation is less.

Figure 7:
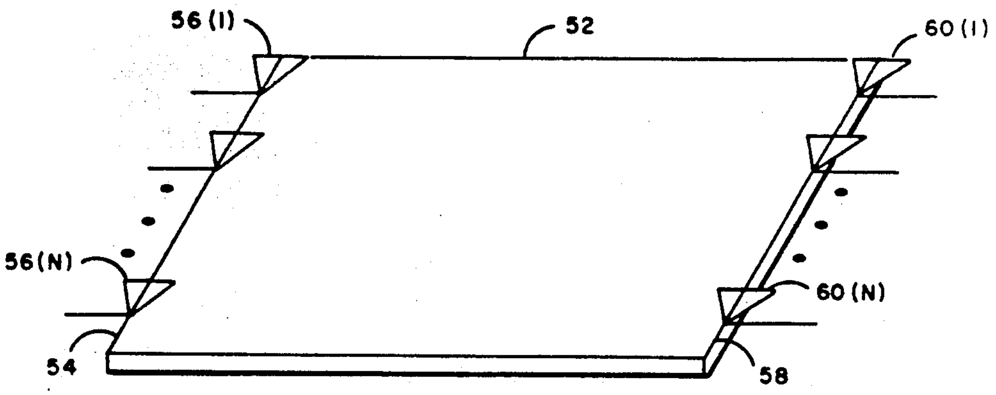
FIG. 7 is a simplified isometric view of a two-dimensional electromagnetic delay line that employs the teachings of the present invention.

An embodiment of the invention that does not use the conductor in the evanescent field is depicted in FIG. 7. The arrangement of FIG. 7 is a two-dimensional dispersive delay line 52. Two-dimensional delay lines of the acoustic variety are known to those skilled in the art. Focusing two-dimensional delay lines are used for spatial Fourier transformations, while imaging two-dimensional delay lines are sometimes used to provide a plurality of channels without incurring the cost of a plurality of separate delay lines. Imaging delay lines are particularly desirable if it is important that the separate channels track each other in phase shift. For all of these purposes, the electromagnetic delay line of FIG. 7 can be used in place of an acoustic delay line.

In addition to the lack of a conductor in its evanescent field, the arrangement of FIG. 7 differs from that of FIGS. 1 and 2 in that its dielectric body is considerably wider and thus provides a wide input edge 54. It additionally differs in that it includes more than one input port, and each input port includes a different one of a plurality of launching antennas 56(l)–56(N) spaced along the input edge 56 of the delay line 52. The shapes of the antennas are determined experimentally to maximize their coupling to the delay line 54 while minimizing antenna cross-coupling, but the general shapes of the coupling elements are the same in cross section as the coupler consisting of elements 12, 16, 24, 34, 36, and 38 of FIG. 2, although certain of the elements, such as the tapered transition regions in the sapphire and the titanium dioxide, are wider to reflect the two-dimensional nature of the delay line. At the opposite, output edge 58 of the delay line 52 are disposed output antennas 60(l)–60(N), which are similarly shaped for coupling of the signals from the delay line 52. In a manner analogous to that in which input and output ports are positioned in acoustic two-dimensional delay lines, the ports of the two-dimensional delay line 52 are arranged along a focus line or at image points, in accordance with the intended function of the delay line.

Figure 8:
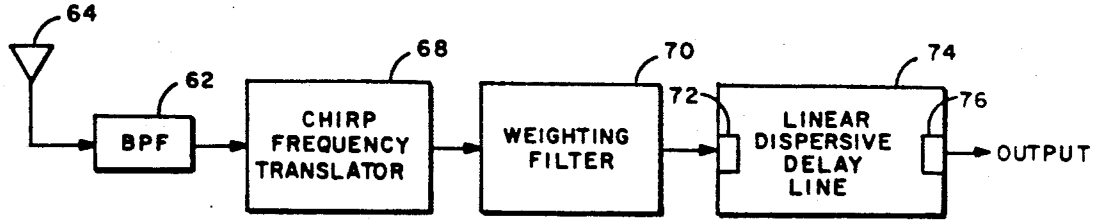
FIG. 8 is a block diagram of a typical compressive receiver that employs the teachings of the present invention.

FIG. 8 depicts in block-diagram form a typical compressive receiver that employs the teachings of the present invention. A bandpass filter 62 band-limits a signal received by an antenna 64 and applies the result to a chirp frequency translator 68. Frequency translator 68 repeatedly sweeps linearly through a frequency range, translating its input signal by the frequencies in the range to generate an output signal in which each narrow-band component in its input results in a component whose instantaneous frequency is a linear function of time within the sweep. A weighting filter 70 band-limits the frequency-translator output to restrict it to the band in which the delay line has a linear relationship of delay to frequency.

As is conventional in compressive receivers, the weighting filter 70 also weights the frequencies in the band with approximately a Gaussian weighting. In the absence of the need to compensate for differential attenuations in subsequent circuitry, this would make a constant-frequency, constant-amplitude input signal—and similarly any narrow-band input signal—result in a weighting-filter output that has a linearly changing instantaneous frequency and an amplitude that is a Gaussian function of time centered on a time within the sweep determined by the frequency of the narrow-band input signal. Since the weighting filter must compensate for the attenuation characteristics of subsequent circuitry, however, the Gaussian weighting is multiplied by further, compensation weighting.

The input port 72 of an electromagnetic linear dispersive delay line 74 of the present invention receives the output of the weighting filter 70. As was explained above, since the delay line 74 is electromagnetic, the input is merely coupled into it without the need for transducers to convert from one form of energy to another. The delay line 74 has a relationship of delay to frequency that causes the frequencies produced later in the sweep in response to a narrow-band frequency component to be delayed less than the frequencies produced in response to the same narrow-band signal earlier in the sweep. The precise delay difference is such that later-produced frequencies reach the delay-line output port 76 at exactly, or almost exactly, the same time as do the frequencies produced earlier in the sweep in response to the same narrow-band signal, so a high-amplitude, short-duration pulse results at the output port 76.

As was stated above, the weighting filter 70 provides, in addition to the Gaussian weighting, further, compensation weighting. This compensation weighting compensates for the attenuation curve of the delay line 74 so that the combination of the weighting filter 70 with the delay line 74 is equivalent to the combination of a purely Gaussian weighting filter with a delay line that has a flat attenuation curve. Consequently, a narrow-band input to the frequency translator 68 can be thought of as producing a weighting-filter output that has a linearly changing instantaneous frequency and an amplitude that is a Gaussian function of time centered on a time within the sweep determined by the frequency of the narrow-band input signal. The delay-line output is a very narrow pulse of oscillations of the delay-line (or, more correctly, the band-pass-filter) center frequency. The dispersive delay line is a linear device and has a notionally flat relationship of frequency to amplitude, so the range of frequencies present in its input must also appear in its output. The instantaneous frequency of the output oscillations does not change much during the short-duration output pulse, however; the frequency range present in the gradually varying instantaneous frequency of the many cycles of input oscillation manifests itself in the high amplitude modulation of the few cycles of output oscillation.

The pulse occurs at a point in the sweep determined by the frequency of the narrow-band signal that gave rise to it, and the relative phase of the output-pulse oscillations is determined by the phase of the narrow-band input; in short, therefore, the compressive receiver can be thought of as an analog Fourier-transformation device. The purpose of the Gaussian weighting is to minimize sidelobe amplitude in the delay-line output for a narrow-band signal; the Fourier transform of a Gaussian pulse is a Gaussian pulse. To emphasize other performance measures, different weighting functions can be employed. Parabolic or sine-squared weighting may be used, for instance, to improve output frequency resolution.

As was mentioned above, two-dimensional compressive receivers have previously been used, and these have employed two-dimensional dispersive acoustic delay lines. According to the teachings of the present invention, a linear dispersive electromagnetic delay line can be used for this purpose. The input circuitry for each delay-line port of such a device is the same as that described above. The delay line may be an imaging delay line, in which each output port is disposed at the image point of a corresponding input port so that its signal is determined exclusively by the signal at its corresponding input port. Such a device is equivalent in function to a plurality of one-dimensional compressive receivers working in parallel but has the advantages of lower cost and better phase tracking between channels. The delay line may in the alternative be a focusing delay line, in which the signal pattern set up among the delay-line output ports is the spatial Fourier transform of the ensemble of input signals. In such a device, the input circuitry is the same as that for an imaging device with the exception that the input circuitry additionally includes Gaussian position weighting; i.e., the weighting for the input ports relative to each other varies with the positions of the input ports in a Gaussian fashion.

Although the present invention has been described by reference to specific embodiments, it can be applied in a wide variety of devices. The input coupler, for instance, does not have to have the sapphire—or, indeed, any—separate-dielectric transition medium. We have found that such a coupler results in a low VSWR in the input cable and is quite efficient in coupling to the dielectric. But it is necessary only that a coupler be used that can couple signals effectively into a surface-electromagnetic-wave guide. Additionally, although we have used titanium dioxide as the dielectric because of its high electrical permittivity, other dielectric substances can be used instead. For instance, we believe that titanium dioxide becomes less desirable above the 10–15 GHz range, and substances such as barium tetratitanate may be preferred. Furthermore, although the specific embodiments act as delays for electromagnetic radiation in the form of microwaves, equivalent arrangements for other portions of the electromagnetic spectrum can be employed instead. Substances used for optic fibers can be employed as the dielectric for electromagnetic radiation in the visible and near-infrared regions, and gallium arsenide, for instance, can be employed for other parts of the infrared spectrum. For ultraviolet light, substances such as quartz, lithium fluoride, and magnesium fluoride can be used. More-exotic versions for delaying X-rays may use plasmas, for instance.

It is thus apparent that the teachings of the present invention can be employed in a wide variety of embodiments and that it eliminates the need for transducers in electrical and optical circuitry. It thus constitutes a significant advance in the art.

What is claimed as new desired to be secured by Letters Patent of the United States is:

1. A compressive receiver comprising:

A. a surface-electromagnetic-wave-guide that includes an input port, an output port, and a dielectric body through which electromagnetic radiation propagates in traveling from the input port to the output port, the dielectric body being dispersive throughout a delay-line frequency band with a substantially linear relationship to frequency of the time required for an electromagnetic wave to propagate through the waveguide; and B. means for repeatedly chirp-translating the frequency components of an input signal within a predetermined input frequency range to produce a chirp signal and for applying the chirp signal to the input port, the chirp rate of the chirp translation being so related to the relationship of delay to frequency as to cause the chirp-signal component that results from a narrow-band component in the input signal to be time-compressed in propagating from the input port to the output port.

2. A compressive receiver as defined in claim 1 wherein the dielectric body has a propagation path therethrough for conducting surface electromagnetic waves therealong, the smallest cross-sectional dimension of the dielectric body perpendicular to the propagation varying with distance along the propagation path in such a manner that the waveguide is dispersive, and has a substantially linear relationship of propagation time to frequency throughout a frequency band wider than that of an elongated surface-electromagnetic-wave guide of the same dielectric material but of uniform cross section.

3. A compressive receiver as defined in claim 2 wherein the linear dispersive delay line includes a plurality of input couplers for launching signals received thereat as surface electromagnetic waves into the dielectric body and a plurality of output couplers for providing signals representative of the surface electromagnetic waves received thereat from the dielectric body.

4. A compressive receiver as defined in claim 3 wherein the dielectric body is arranged to provide image points for the input couplers and the output couplers are disposed at the image points so that each input coupler and the output coupler disposed at the image point thereof act as the input and output ports of a channel isolated from the channels for which the other couplers act as ports.

5. A compressive receiver as defined in claim 3 wherein the input couplers are so positioned with respect to each other as to have a focal line in the dielectric body and the output couplers are positioned on the focal line to provide as outputs separate spatial-frequency components of the ensemble of signals appearing at the input ports.

* * * * *